US012753877B2

(12) United States Patent
Korver et al.

(10) Patent No.: US 12,753,877 B2
(45) Date of Patent: Oct. 6, 2026

(54) SHAFT LUBRICATION SYSTEM

(71) Applicant: K&L Technologies, Inc., Adams, NE (US)

(72) Inventors: Justin Paul Korver, Lincoln, NE (US); Jay Michael Steinman, Lincoln, NE (US)

(73) Assignee: K&L Technologies, Inc., Adams, NE (US)

( * ) Notice: Subject to any disclaimer, the term of this patent is extended or adjusted under 35 U.S.C. 154(b) by 0 days.

(21) Appl. No.: 18/967,128

(22) Filed: Dec. 3, 2024

(65) Prior Publication Data

US 2025/0180160 A1 Jun. 5, 2025

Related U.S. Application Data

(60) Provisional application No. 63/606,525, filed on Dec. 5, 2023.

(51) Int. Cl.
*F16N 7/38* (2006.01)
*E21B 41/00* (2006.01)
(Continued)

(52) U.S. Cl.
CPC ................ *F16N 7/38* (2013.01); *E21B 41/00* (2013.01); *E21B 43/126* (2013.01); *F16N 29/02* (2013.01);
(Continued)

(58) Field of Classification Search
CPC ........ F16N 7/38; F16N 29/04; F16N 2210/16; F04D 13/10
See application file for complete search history.

(56) References Cited

U.S. PATENT DOCUMENTS 5,996,739 A * 12/1999 Hoffmann ................ F01M 1/16 184/7.4
6,312,226 B1 * 11/2001 Senior, Jr. ............... F04D 13/10 417/63
(Continued)

FOREIGN PATENT DOCUMENTS

CN 116241788 A * 6/2023 ............... F16N 7/38

OTHER PUBLICATIONS

Hoffman&Hoffman, "Vertical Turbine Pump Lubrication," Water Well Monitoring & Control, available at: https://www.hw-well.com/, last accessed Dec. 3, 2024, 2 pages.

*Primary Examiner* — Michael A Riegelman
(74) *Attorney, Agent, or Firm* — Suiter Swantz IP

(57) ABSTRACT

A lubrication system may include a lubricant pump configured to dispense lubricant, a motor mechanically coupled to the lubricant pump, and a lubricant sensor configured to sense an amount of lubricant dispensed by the lubricant pump and transmit sensor data associated with a sensed amount of the dispensed lubricant. The lubrication system may include a controller coupled to the lubricant sensor and the motor, the controller including one or more processors configured to execute a set of program instructions stored in a memory, the set of program instructions configured to cause the one or more processors to: receive an operation signal associated with the well pump, wherein the operation signal is transmitted to the controller when the well pump is activated, cause the motor to operate upon receiving the operation signal, receive the sensor data; and cause a change in a rate of the motor based on the sensor data.

14 Claims, 5 Drawing Sheets

(51) Int. Cl.
*E21B 43/12* (2006.01)
*F16N 29/02* (2006.01)
*F16N 29/04* (2006.01)

(52) U.S. Cl.
CPC .......... *F16N 29/04* (2013.01); *F16N 2210/16* (2013.01); *F16N 2230/02* (2013.01); *F16N 2250/40* (2013.01); *F16N 2270/72* (2013.01)

(56) References Cited

U.S. PATENT DOCUMENTS

| | | | | |
|---|---|---|---|---|
| 9,353,849 | B2 * | 5/2016 | Uusitalo | F16H 57/0435 |
| 9,353,908 | B2 * | 5/2016 | Kuvaja | F16N 7/38 |
| 9,474,216 | B1 * | 10/2016 | Reiss | A01G 25/165 |
| 9,618,155 | B2 * | 4/2017 | Conley | F16N 29/02 |
| 10,876,685 | B2 * | 12/2020 | Alexander | F16N 13/14 |
| 2002/0125074 | A1 * | 9/2002 | Roehrborn | F16N 7/38<br>184/58 |
| 2006/0231341 | A1 * | 10/2006 | Wech | F16N 17/04<br>184/6.22 |
| 2013/0074628 | A1 * | 3/2013 | Uusitalo | F16H 57/0435<br>74/467 |
| 2015/0354326 | A1 * | 12/2015 | Lisk | F04D 13/10<br>166/53 |
| 2018/0171766 | A1 * | 6/2018 | Clingman | F04D 13/10 |
| 2018/0195667 | A1 * | 7/2018 | Alexander | F16N 13/04 |
| 2020/0208776 | A1 * | 7/2020 | Bayyouk | F16N 7/38 |
| 2021/0355933 | A1 * | 11/2021 | Semple | F04B 9/1207 |
| 2024/0011601 | A1 * | 1/2024 | Smid | F16N 25/00 |
| 2025/0180160 | A1 * | 6/2025 | Korver | F16N 29/04 |

* cited by examiner

SHAFT LUBRICATION SYSTEM

CROSS-REFERENCE TO RELATED APPLICATIONS

The present application claims priority to U.S. Provisional Patent Application No. 63/606,525, filed Dec. 5, 2023, which is incorporated herein by reference in its entirety.

BACKGROUND

Monitoring gravity oil drip systems for irrigation well pumps is often mandatory and tedious. Irrigation wells are generally located remotely, away from roads and habitation, where access is limited to unimproved service roads or paths. Well operation depends on irrigation demand with well lubrication needs further depending on varying ambient conditions.

Additionally, well oilers are prone to failure due to clogging, vapor locks, and other breakdowns. Determining the function of an irrigation well must also include the determination of, and setting of, the rate of lubrication of lubricant. Flow rate requirements are also dependent on the type of lubricant and its viscosity as demand and temperatures fluctuate. For example, adjustments are periodically required for various changes in process requirements including but not limited to changing pump rates, system runtime duration, and system idle time durations. Adjustments are often required for changes in seasonal and environmental conditions that can change slowly or quickly. Adjustments are also often required based on equipment and components including the oil type being used, cleanliness of the oil, needle valve clogging, solenoid valve malfunctions, tubing, cleanliness of screens, and cleanliness of other oil-contacting components. If a lubrication system fails to work properly while the target system is running, then seizure of frictional components will result. Friction-induced failure repair cost may approach or be equivalent to the cost of a new well.

Furthermore, modern equipment often has the ability to operate at variable rates and may require specialized lubricants. Thus, there is a need for a lubrication system having both active and passive features that continuously vary application rates while avoiding the disadvantages of a solely passive type of delivery system.

SUMMARY

In some embodiments, the techniques described herein relate to a lubrication system for a well pump shaft including: a lubricant pump configured to dispense lubricant; a motor mechanically coupled to the lubricant pump; a lubricant sensor configured to sense an amount of lubricant dispensed by the lubricant pump and transmit sensor data associated with a sensed amount of the dispensed lubricant: and a controller communicatively coupled to the lubricant sensor and the motor, the controller including one or more processors configured to execute a set of program instructions stored in a memory, the set of program instructions configured to cause the one or more processors to: receive an operation signal associated with the well pump, wherein the operation signal is transmitted to the controller when the well pump is activated; cause the motor to operate upon receiving the operation signal; receive the sensor data; and cause a change in a rate of the motor based on the sensor data.

In some embodiments, the techniques described herein relate to a lubrication system, wherein the controller is further configured to transmit an alarm signal if the lubrication system is unable to lubricate the well pump shaft.

In some embodiments, the techniques described herein relate to a lubrication system, wherein the controller causes the well pump to deactivate based on a signal associated with the lubricant sensor.

In some embodiments, the techniques described herein relate to a lubrication system, further including a transceiver coupled to the controller and configured to communicate with a remote device, wherein the transceiver is configured to receive status data from the controller and may transmit the status data to the remote device.

In some embodiments, the techniques described herein relate to a lubrication system, wherein the transceiver is further configured to receive input data from the remote device and transmit the input data to the controller.

In some embodiments, the techniques described herein relate to a lubrication system, wherein the input data includes a pre-operation instruction configured to cause the lubrication system to dispense lubricant before receiving the operation signal.

In some embodiments, the techniques described herein relate to a lubrication system, wherein the input data includes setting instructions configured to cause the lubrication system to adjust the rate of the motor.

In some embodiments, the techniques described herein relate to a lubrication system, wherein the input data includes an operation instruction configured to cause the lubrication system to switch between an ON status and an OFF status.

In some embodiments, the techniques described herein relate to a lubrication system, wherein the lubricant sensor includes a photoelectric sensor.

In some embodiments, the techniques described herein relate to a lubrication system, wherein the lubricant pump includes a peristaltic pump.

In some embodiments, the techniques described herein relate to a lubrication system, wherein the motor includes a stepper motor.

In some embodiments, the techniques described herein relate to a lubrication system, further including a lubricant reservoir.

In some embodiments, the techniques described herein relate to a lubrication system, further including: a housing configured to house the controller; and a user interface associated with the housing.

In some embodiments, the techniques described herein relate to a lubrication system, wherein the user interface includes a keypad and a display.

In some embodiments, the techniques described herein relate to a lubrication system, wherein the housing houses the lubricant pump disposed behind a transparent shield, wherein a function of the lubricant pump can be observed through the transparent shield.

In some embodiments, the techniques described herein relate to a lubrication system for a mechanical system including: a peristaltic lubricant pump configured to dispense lubricant; a stepper motor mechanically coupled to the peristaltic lubricant pump; a lubricant sensor configured to sense an amount of lubricant dispensed by the lubricant pump and transmit sensor data associated with a sensed amount of the dispensed lubricant: and a controller communicatively coupled to the photoelectric lubricant sensor and the stepper motor, the controller including one or more processors configured to execute a set of program instructions stored in a memory, the set of program instructions configured to cause the one or more processors to: receive an operation signal associated with the mechanical system, wherein the operation signal is transmitted to the controller when the mechanical system is activated; cause the stepper motor to operate upon receiving the operation signal; receive the sensor data; and cause a change in a rate of the stepper motor based on the sensor data.

In some embodiments, the techniques described herein relate to a lubrication system, further including a transceiver coupled to the controller and configured to communicate with a remote device, wherein the transceiver is configured to receive status data from the controller and transmit the status data to the remote device, wherein the transceiver is further configured to receive input data from the remote device and transmit the input data to the controller.

In some embodiments, the techniques described herein relate to a lubrication system, wherein the remote device is configured to input: a pre-operation instruction configured to cause the lubrication system to dispense lubricant before receiving the operation signal; a setting instruction configured to cause the lubrication system to adjust the rate of the stepper motor; and an operation instruction configured to cause the lubrication system to switch between an ON status and an OFF status.

In some embodiments, the techniques described herein relate to a lubrication system, further including a housing configured to house: a user interface, wherein the user interface includes a keypad and a display; and the lubricant pump, wherein a movement of the lubricant pump can be observed through a transparent shield of the housing.

In some embodiments, the techniques described herein relate to a method for operating a lubrication system for a pumping system including: receiving an operation signal associated with the pumping system, wherein the operation signal is transmitted to a controller when the pump motor is activated; causing a lubrication motor to operate upon receiving the operation signal; receiving sensor data from a lubricant sensor; causing a change in a rate of the lubrication motor based on the sensor data; and, upon an indication of low oil, deactivating the lubrication system.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
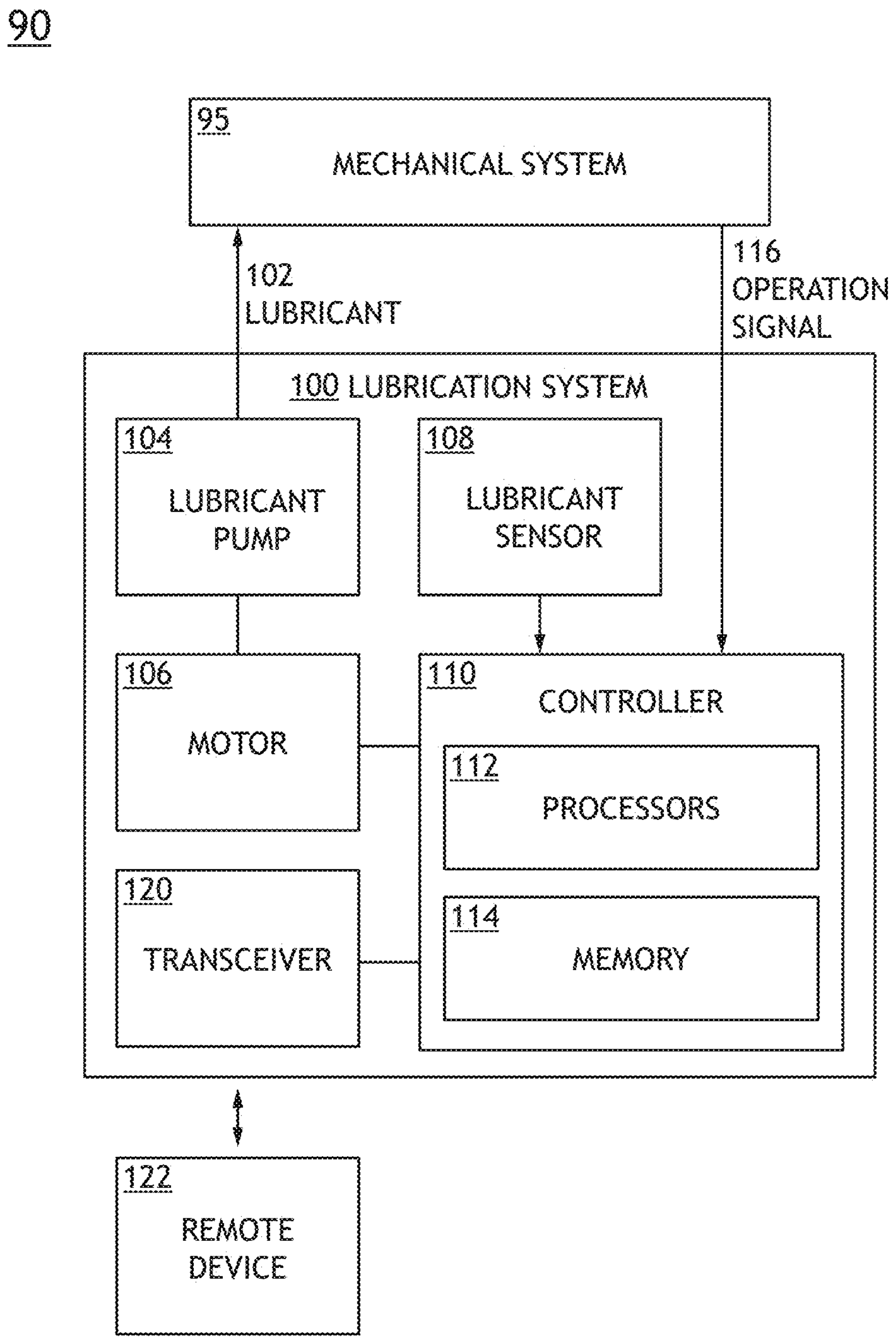
FIG. 1 is a block diagram of a system that includes a mechanical system lubricated by a lubrication system, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present), and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A lubrication system for a mechanical system, such as a well pump (e.g., for lubricating a well pump shaft and/or associated bearing and bushings), is disclosed. The lubrication system includes a lubricant pump, a motor to operate the lubricant pump, a sensor to detect the amount of lubricant dispensed by the pump, a sensor for detecting the presence or level of lubricant in a lubricant reservoir, and a controller that can change motor settings based on readings by the sensor. The lubrication system may further include a transceiver (e.g., transmitter and/or receiver) that can communicate with a remote device, such as a user's smartphone. The lubrication system provides advantages over current systems that do not detect whether the lubrication system is dispensing lubricant and therefore require constant surveillance from the operator. The lubrication system also provides more convenience than current systems, as the settings of the lubrication system can be adjusted remotely and/or automatically.

FIG. 1 is a block diagram of a system 90 that includes a mechanical system 95 lubricated by a lubrication system 100, in accordance with one or more embodiments of the disclosure. The lubrication system 100 provides lubricants 102 (e.g., oils, greases) to the mechanical system 95. The mechanical system 95 may include any type of mechanical device including, but not limited to well pumps and well pump shafts. For example, the mechanical system 95 may include a well pump, such as a well pump to an irrigation system (e.g., pivot irrigation system) that requires lubrication. Irrigation systems often include irrigation pumps with shafts that rotate, with an impeller connected to, or otherwise associated with, the shaft generating the water pressure that is required to distribute water through the irrigation system. If the shaft and/or shaft bearings are not adequately lubricated during operation, damage may occur.

In embodiments, the lubrication system 100 includes a lubricant pump 104 configured to dispense lubricant 102 to the mechanical system 95. For example, the lubricant pump 104 may be configured to dispense lubricant onto a shaft of a well pump. The lubricant pump 104 may include any type of pump technology including, but not limited to, peristaltic pumps, centrifugal pumps, positive displacement pumps, submersible pumps, screw pumps, diaphragm pumps, progressing cavity pumps, linear actuator pumps (e.g., linear actuator plunger dispensers), and lobe pumps. For example, the lubrication pump 104 may include a peristaltic pump with surfaces resistant to oils and greases. The dispensing of the lubricant 102 by the lubricant pump 104 may result in either constant (e.g., a stream) or intermittent (e.g., dripping) delivery of lubricant 102 to the mechanical system 95. For example, the lubrication system 100 may include a lubrication pump 104, such as a peristaltic lubrication pump, that when operating, dispenses drops of lubricant 102 onto and/or adjacent to the shaft of the well pump. In another example, the lubrication system 100 may, via the lubricant pump 104, dispense drips of oil at a variable rate, such as a rate based on a user set point.

In embodiments, the lubrication system 100 includes a motor 106 mechanically coupled to the lubricant pump 104. The motor 106 may be controllable, with the rate of rotation adjustable. The motor 106 may include any type of motor capable of operating the lubricant pump 104 including, but not limited to, a stepper motor, a servo motor, and an induction motor. For example, the motor 106 may include a stepper motor such as, but not limited to, a permanent magnet stepper motor, a variable reluctance stepper motor, or a hybrid stepper motor.

In embodiments, the lubrication system 100 includes a lubricant sensor 108 configured to sense an amount of lubricant 102 dispensed by the lubricant pump 104 and transmit sensor data associated with a sensed amount of the dispensed lubricant 102. The lubricant sensor 108 may include any type of sensor or sensor technology (e.g., discrete presence sensors) including, but not limited to, photoelectric sensors, proximity sensors (e.g., capacitive proximity sensors, magnetic sensors, infrared sensors, tactile sensors, microwave sensor, laser sensors, ultrasonic sensors, vibration sensors, and pressure sensors. For example, the lubricant sensor 108 may include a photoelectric sensor that can detect drips of lubricant 102 that are being dispensed from the lubrication system 100.

In embodiments, the lubrication system 100 includes one or more controllers 110 communicatively coupled to at least one of the lubricant sensor 108 and the motor 106. The controller 110 may include one or more processors 112 and memory 114. The one or more processors 112 of the controller 110 may be configured to execute a set of program instructions stored in memory 114. The set of program instructions may be configured to cause the one or more processors 112 to carry out various steps and processes of the present disclosure.

In embodiments, the controller 110 is configured to receive an operation signal 116 associated with the mechanical system 95 (e.g., the well pump). The operation signal 116 may be any signal that directly or indirectly indicates that the mechanical system 95 is active (e.g., that the shaft of the well pump is rotating). For example, the operation signal 116 may include a communication signal intentionally sent from the mechanical system 95 to the controller 110. In another example, the operation signal 116 may be a stray voltage signal generated by a well pump motor and detected by a stray voltage detector on the lubrication system 100. In another example, the lubrication system 100 may include other sensors for sensing the state of the mechanical system 95 including, but not limited to, vibration sensors, static electricity sensors, and temperature sensors.

In embodiments, the controller 110 is configured to cause the motor to operate when the mechanical system is activated. For example, once the controller receives indication that the well pump is running (e.g., via the operation signal 116), the controller 110 may, via the one or more processors 112, cause the motor to activate, which causes the lubrication pump to dispense lubricants to the mechanical system 95. In embodiments, the controller 110 is configured to receive sensor data 118 from the lubricant sensor 108. For example, the controller 110 may receive flow data from the lubricant sensor 108.

In embodiments, the controller 110 is configured to cause a change in a rate of the motor 106 based on the sensor data 118. For example, if the sensor data 118 received by the controller 110 indicates that the current dispensing of lubricant to the mechanical system 95 is inadequate or less than the instructed or expected rate, the controller 110 may then, via the one or more processors 112, cause the motor 106 to speed up, increasing the flow of lubricant 102 to the mechanical system 95. The controller 110 may correspondingly cause the motor 106 to slow down if the received sensor data 118 indicates that the rate of dispensing of lubricant to the mechanical system 95 is too high. In this manner, the lubrication system operates as a feedback system.

In embodiments, the lubrication system 100 includes one or more transceivers 120 coupled to the one or more controllers 110 and configured to communicate with a remote device 122. The remote device may include any type of device capable of wireless communication including but not limited to, a computer, a smartphone, and a tablet. The transceiver 120 may be configured to communicate with the remote device via any type of communication including but not limited to, sensor data, mechanical system status, lubrication system status, and lubrication system settings. The transceiver 120 may also be coupled to one or more sensors, such as the lubricant sensor 108. In embodiments, the lubrication system includes the remote device 122.

As described herein, one or more transceivers 120, lubricant sensor 108, and/or other sensors may include a connectivity architecture that includes one or more mobile applications, cellular-connected devices, satellite-connected devices, or gateway-connected devices for moving data to or from the controller 110. For example, components of the lubrication system 100 may be communicatively coupled to one or more wireline-based interface devices (e.g., DSL-based interconnection, cable-based connection, T9-based interconnection, and the like), or one or more wireless-based interface devices employing GSM, GPRS, CDMA, EV-DO, EDGE, WiMAX, 3G, 4G, LTE, 5G, 6G, ISM, Wi-Fi protocols, RF, and the like. One or more components of the lubrication system may be configured to operate using one or more communication protocols, including, without limitation, Bluetooth, Zigbee, and/or LoRa. It is further noted herein that the one or more components of lubrication system 100 may be communicatively coupled to the various other components of lubrication system 100 and/or the mechanical system 95 in any manner known in the art.

Figure 2:
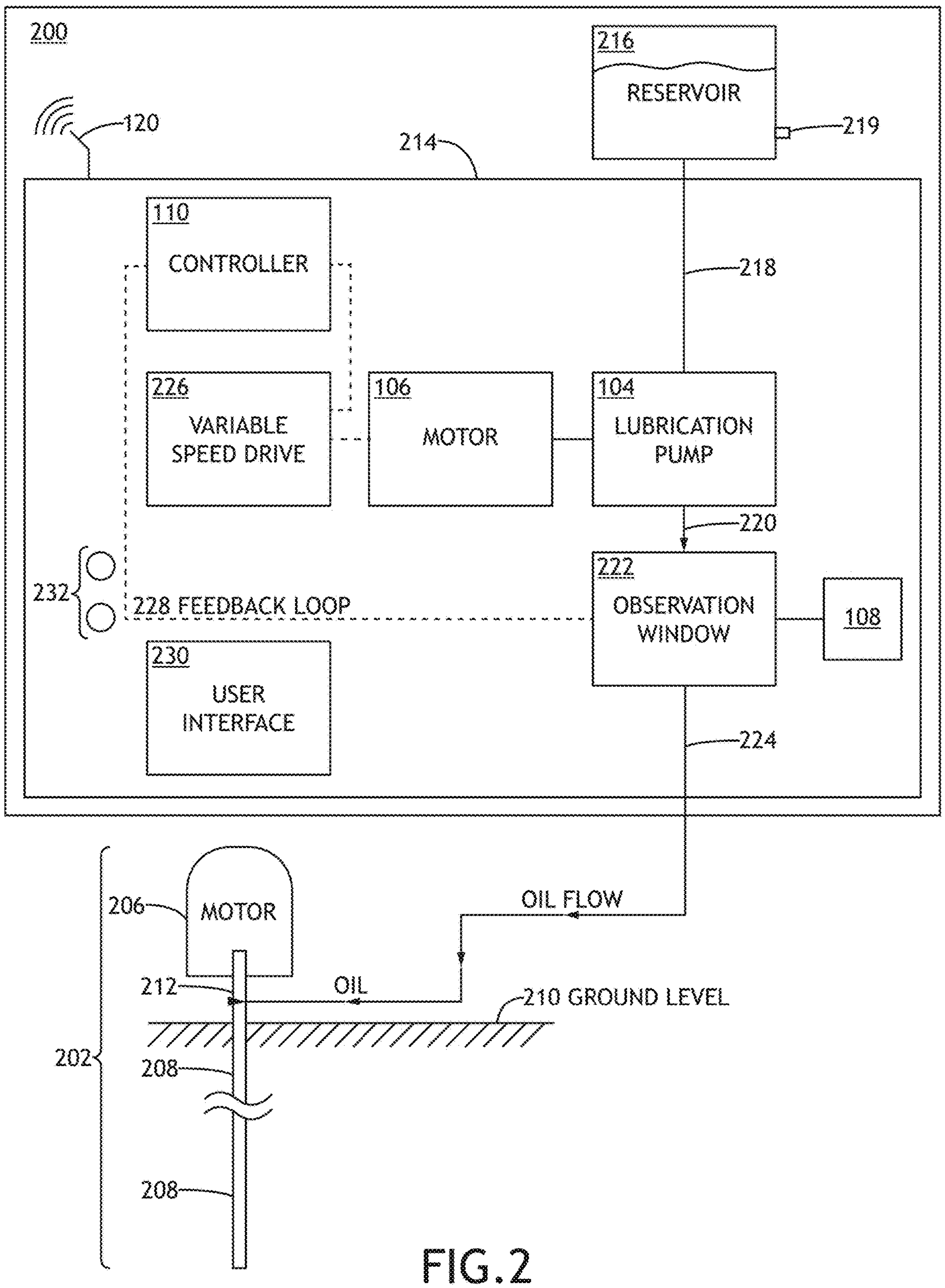
FIG. 2 is a simplified schematic of a lubrication system configured to lubricate a pumping system within an environment, in accordance with one or more embodiments of the disclosure.

FIG. 2 is a simplified schematic of a lubrication system 200 configured to lubricate a pumping system 202 within an environment 204, in accordance with one or more embodiments of the disclosure. The lubrication system 200 may include one or more components of lubrication system 100 and vice versa. The pumping system 202 may include a pump motor 206 coupled to a pump shaft 208. The pump shaft 208 may extend below ground level 210. The pump shaft 208 may receive lubricants 102 from the lubrication system 200 at a lubrication point 212.

In embodiments, the lubrication system 200 includes a housing 214 configured to house one or more components of the lubrication system. In embodiments, the lubrication system 200 includes a reservoir 216 configured to store lubricants used by the lubrication system 200. The reservoir 216 may be coupled to the lubrication pump 104 via a lubricant supply line 218 configured to deliver lubricants 102 from the reservoir 216 to the lubrication pump 104. For example, the lubricant supply line 218 may include suction tubing and provide negative relative pressure, enabling the lubricants 102 to flow to the lubrication pump 104. The reservoir 216 may be disposed outside, or within, the housing 214. In embodiments, the reservoir 216 includes a lubricant level sensor 219 communicatively coupled to the controller 110 and configured to monitor the lubricant level or lubricant quantity (e.g., volume) in the reservoir 216 and provide an alarm if the lubricant level is below a predetermined threshold level.

In embodiments, the lubrication system 100 includes a discharge port 220 that permits the dispensing of lubricants 102 from the lubrication pump 104, and an observation window 222 where a flow of lubricants 102 from the discharge port 220 can be detected (e.g., via the lubricant sensor 108). In embodiments, the observation window includes a visual sight that allows an observer to see the lubricant as it is being dispensed. Once observed, the lubricant 102 travels along a lubrication tube 224 to the pump shaft 208.

In embodiments, the controller 110 controls the motor via variable speed drive 226 that controls the flow of energy from a power source (e.g., a battery or main power) to the motor 106. For example, the controller 110, receiving data from the lubricant sensor 108 (e.g., data received by observing the observation window 222) transmits an instruction to the variable speed drive 226 causing the motor 106 to make an appropriate change in the flow rate of the pump, thereby utilizing a feedback loop 228.

In embodiments, the lubrication system 200 includes a user interface 230 configured to permit communication between the lubrication system 200 and an operator. For example, the user interface 230 may include a display configured to display status data and/or display programming text as entered by the operator. In another example, the user interface 230 may include a keypad or other componentry for inputting programming. The user interfaces 230 shown and described are provided solely for illustrative purposes and to provide the reader with a more thorough understanding of the inventive concepts of the present disclosure. Therefore, the user interfaces depicted in this disclosure are not to be regarded as limiting, and additional and/or alternative user interfaces may be used without departing from the spirit or scope of the present disclosure. The lubrication system 200 may further include one or more indicator lights 232 (e.g., LED lights) as part of the user interface 230.

In embodiments, the controller 110 is configured to cause an alarm signal to be transmitted if the lubrication system 100 is unable to lubricate the mechanical system 95. For example, upon a reduced or lack of lubricant flow as sensed by the lubricant sensor 108, the controller 110 may cause the user interface 230 to display an alarm and/or the transceiver 120 to send an alarm to the remote device 122. In another example, upon a reduced or lack of lubricant flow as sensed by the lubricant sensor 108, the controller 110 may cause the mechanical system 95 (e.g., well pump motor) to deactivate.

Figure 3:
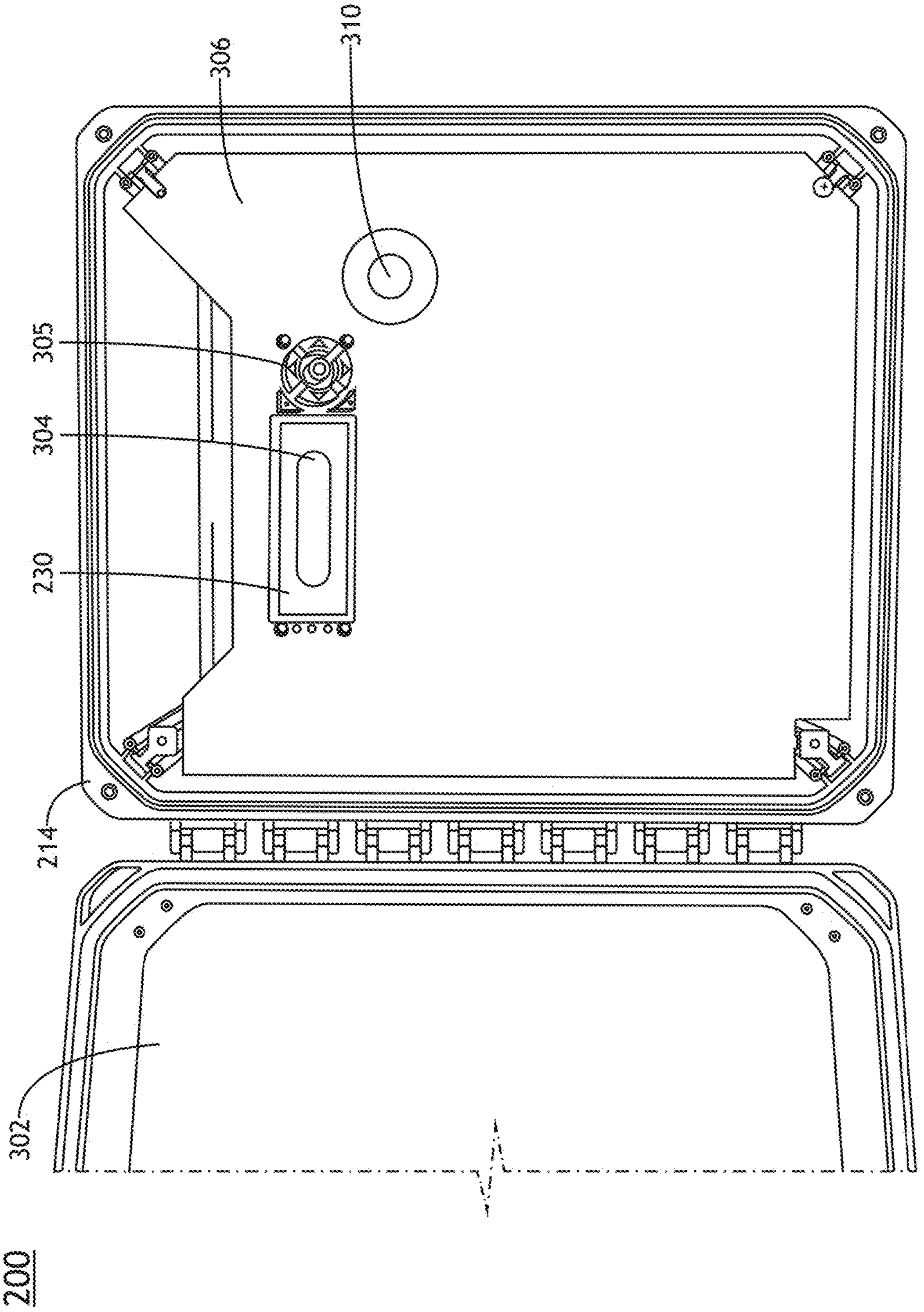
FIG. 3 illustrates a front view of a housing of lubrication system, with a front panel in an opened configuration, in accordance with one or more embodiments of the disclosure.

FIG. 3 illustrates a front view of a housing 214 of lubrication system 200, with a front panel 302 in an opened configuration, in accordance with one or more embodiments of the disclosure. In embodiments, the housing 214 includes the protective front panel 302 that can be partially or wholly removed. For example, the front panel 302 may protect the user interface 230 (e.g., a display 304 and keypad 305) from dust and rain. The lubrication system 200 may further include one or more internal panels 306 for protecting and/or mounting of electronic componentry, such as the controller 110. The lubrication system 200 may further include a light 310, such as an LED light for illumination. The light 310 may be positioned on the housing 214 or configured to shine light through an aperture in the housing 214. The lubrication system 200 may further include a reset button configured to clear alarms and/or reset the lubrication system (e.g., to resume operation).

Figure 4:
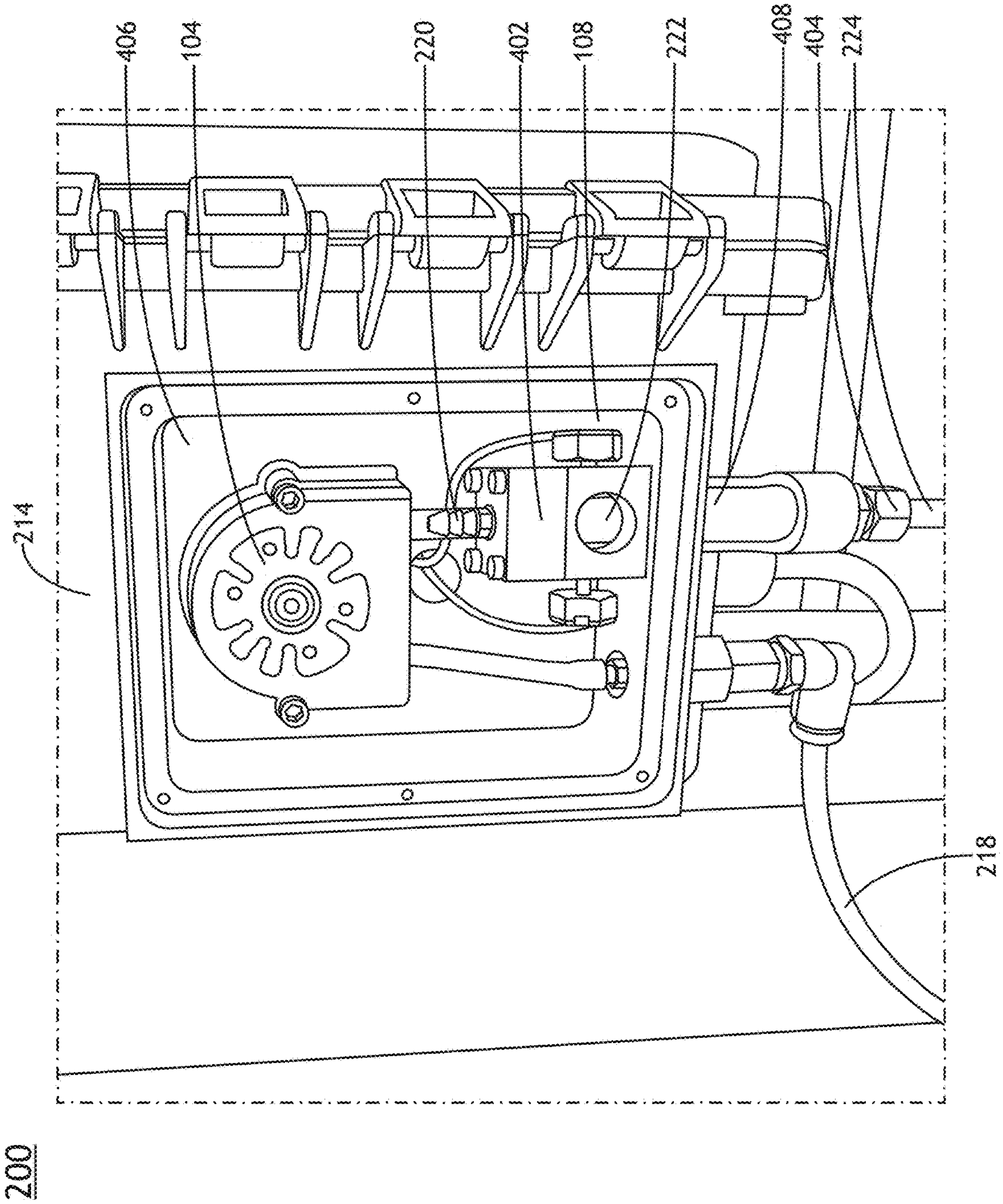
FIG. 4 illustrates a close-up lower side view of the housing of the lubrication system, in accordance with one or more embodiments of the disclosure.

FIG. 4 illustrates a close-up lower side view of the housing 214 of the lubrication system 200, in accordance with one or more embodiments of the disclosure. The view depicts a peristaltic lubrication pump 104 coupled to the lubricant supply line 218 and a discharge port 220 that leads into an observation chamber 402 that houses the observation window 222 and the lubricant sensor 108. The view further depicts a coupler 404 couplable to the lubrication tube 224 that receives the lubricants 102 after they pass the lubricant sensor 108.

In embodiments, the lubrication system 200 further includes a shield 406 that provides protection for one or more components of the lubrication system 200 (the shield is removed in FIG. 4). For example, the shield 406 may include a metal plate. In another example, the shield may include a transparent section that allows one or more components to be observed by an observer. For example, the shield 406 may allow an observer to visualize the rotation (e.g., movement or function) of the peristaltic pump. In embodiments, the lubrication system 200 includes the slight line 408, allowing the observer to see the flow (e.g., drips) of lubricant 102, as shown.

Figure 5:
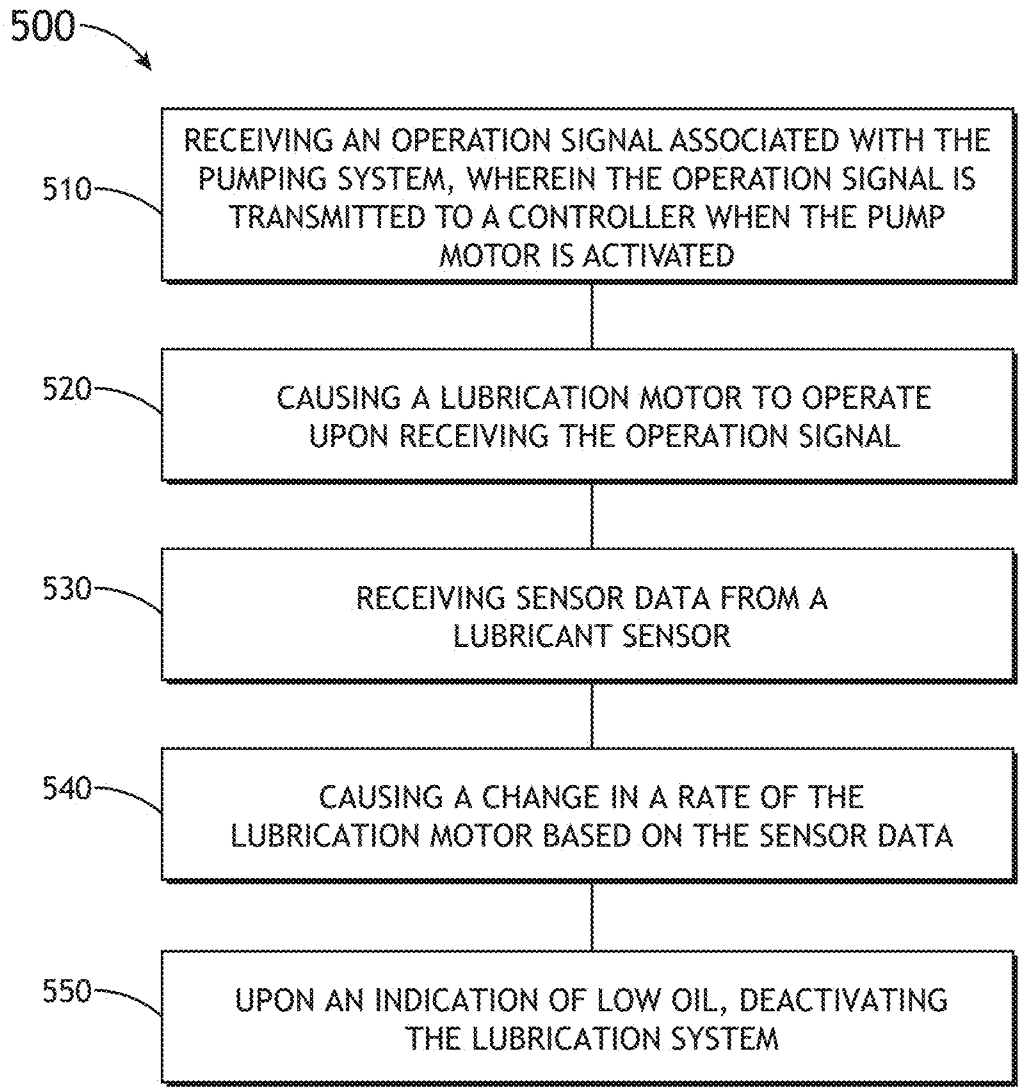
FIG. 5 illustrates a flow diagram depicting a method for operating a well pump shaft lubrication system, in accordance with one or more embodiments of the disclosure.

FIG. 5 is a flow diagram depicting a method 500 for operating a well pump shaft lubrication system, in accordance with one or more embodiments of the disclosure. The method 500 may be utilized with the lubrication systems 100, 200 as described herein.

In embodiments, the method 500 includes a step 510 of receiving an operation signal (e.g., a system run signal) associated with the pumping system 202, wherein the operation signal is transmitted to a controller 110 when the pump motor 206 is activated. The operation signal may include any direct or indirect indication that the pump motor 206 is running.

In embodiments, the method 500 includes a step 520 of causing a lubrication motor 106 to operate (e.g., via the controller 110) upon receiving the operation signal. In embodiments, the method 500 includes a step 530 of receiving sensor data from the lubricant sensor 108. In embodiments, the method includes a step 540 of causing a change in a rate of the lubrication motor 106 based on the sensor data (e.g., based on the feedback loop 228). In embodiments, the method 500 includes a step 550 of upon an indication of low oil, deactivating the lubrication system 200. For example, if the lubricant level sensor 219 senses a low level of lubricant 102 in the reservoir 216, the lubricant level sensor 219 may send an alarm signal to the controller 110, which then causes the motor 106 to stop.

In embodiments, the lubrication system 200 may provide and/or receive various signal inputs and outputs. These signal inputs and outputs may be analog or digital in nature. For example, one or more components of the lubrication system 200 may receive a lubricant drip input from the lubricant sensor 108, which monitors the drips of lubricant to calculate a lubricant drip rate. In another example, one or more components of the lubrication system 200 may transmit a relay output to the external mechanical system 95 for the purpose of relaying to the mechanical system 95 that the lubrication system 200 is operational and/or that there are no alarms. In another example, one or more components of the lubrication system 200 may transmit or receive a relay output in the form of a system alarm, which relays to other components indicating that the system is in an alarm state. In another example, one or more components of the lubrication system 200 may transmit or receive a lubricant pump step signal (e.g., a pulsed digital signal), providing a pulse output that controls the motor 106.

In embodiments, the lubrication system 200 monitors the number of oil drips and calculates the drip rate in drips per minute. In embodiments, the system adjusts the oil drip rate by varying the rate of output pulses (e.g., to the motor 106), or by adjusting an analog signal using an automatic closed-loop control. In embodiments, the lubrication system 200 accepts a drip rate setpoint range from 5 drips per minute to 50 drips per minute. In embodiments, the lubrication system 200 is configured to receive a start input for starting the motor 106 remotely. In embodiments, the lubrication system 200 is configured to transmit a discrete output signaling that the lubrication system 200 is in an operational state. In embodiments, the lubrication system 200 includes a lubrication primer. For example, an operator may manually operate the lubrication primer to prime at least one of the lubricant pump 104, or the lubricant supply line 218 with lubricant. In embodiments, the lubrication system 200 is configured to have a manual start system, enabling an operator to manually start the lubrication system 200 before the motor 106 is started. In embodiments, the controller 110 receives input data that includes a pre-operation instruction configured to cause the lubrication system 100 to dispense lubricant 102 before receiving the operation signal. In embodiments, the controller 110 receives input data that includes an operation instruction configured to cause the lubrication system to switch between an ON status and an OFF status.

In embodiments, the controller 110 is configured to perform a scheduling function for controlling the lubrication system 200. For example, the controller 110 may include an internal clock and instructions saved to memory 114 that instruct the controller to turn OFF and/or ON the lubricant pump 104 at time intervals. For example, the controller may be instructed to start lubrication at 10:00 a.m. on Monday, Wednesday, and Friday of a given week.

In embodiments, the user interface 230 is configured to display one or more of a power-on indicator, an enable/run status, a drip rate setpoint, a current drip rate (e.g., monitored drip rate), and alarm status. In embodiments, the user interface 230 is configured to configure the drip rate setpoint or setpoint range. In embodiments, firmware used within the lubrication system 200 for modifying control parameters or changing calibration parameters is updateable/flashable. For example, the firmware may be flashed over-the-air (OTA). In embodiments, the user interface 230 alarms if the lubricant drip rate or volume is below a setpoint. For example, the user interface 230 may alarm if the lubricant drip rate is below the setpoint by a predetermined amount (e.g. 5 drips per minute) for more than a predetermined time period (e.g., 10 minutes). In embodiments, the user interface 230 alarms if the level of lubricant 102 in the reservoir 216 is below the lubricant level sensor.

In embodiments, the lubrication system 200 is configured for cellular network connection (e.g., a cloud interface), as detailed herein. For example, the lubrication system 200 may include a user-accessible dashboard via the remote device 122. The user-accessible dashboard may have applications that enable scheduling of the motor 106 to start and run on a schedule even when the mechanical system 95 is not running. In another example, the cellular network connection is configured for performing software (OTA) updates.

In embodiments, the lubrication system 200 includes one or more vibrational dampening elements including but not limited to rubber/rubber-like mounts gel pads, sorbothane, foam inserts, and damping gel.

In embodiments, the lubrication system 200 is configured to operate in an outdoor environment. For example, the lubrication system 200 may be configured to operate from −30° C. to 70° C. or −20° C. to 60° C. In another example, the lubrication system 200 may be configured to operate from 5% to 95% (e.g., non-condensing), or from 5% to 100% relative humidity. In embodiments, the lubrication system 200 is designed to accept 120 VAC power to an internal transformer to produce 24V direct current (DC) power.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A lubrication system for a well pump shaft of a well pump comprising:

a lubricant pump configured to dispense lubricant;

a motor mechanically coupled to the lubricant pump;

a lubricant sensor configured to sense an amount of lubricant dispensed by the lubricant pump and transmit sensor data associated with a sensed amount of a dispensed lubricant;

a controller communicatively coupled to the lubricant sensor and the motor, the controller including one or more processors configured to execute a set of program instructions stored in a memory, the set of program instructions configured to cause the one or more processors to:

receive an operation signal associated with the well pump, wherein the operation signal is transmitted to the controller when the well pump is activated;

cause the motor to operate upon receiving the operation signal;

receive the sensor data; and cause a change in a rate of the motor based on the sensor data; and a transceiver coupled to the controller and configured to communicate with a remote device, wherein the transceiver is configured to receive status data from the controller and transmit the status data to the remote device; wherein the transceiver is further configured to receive input data from the remote device and transmit the input data to the controller, wherein the input data comprises a pre-operation instruction configured to cause the lubrication system to dispense lubricant before receiving the operation signal.

2. The lubrication system of claim 1, wherein the controller is further configured to transmit an alarm signal if the lubrication system is unable to lubricate the well pump shaft.

3. The lubrication system of claim 1, wherein the controller causes the well pump to deactivate based on a signal associated with the lubricant sensor.

4. The lubrication system of claim 1, wherein the input data comprises setting instructions configured to cause the lubrication system to adjust the rate of the motor.

5. The lubrication system of claim 1, wherein the input data comprises an operation instruction configured to cause the lubrication system to switch between an ON status and an OFF status.

6. The lubrication system of claim 1, wherein the lubricant sensor comprises a photoelectric sensor.

7. The lubrication system of claim 1, wherein the lubricant pump comprises a peristaltic pump.

8. The lubrication system of claim 1, wherein the motor comprises a stepper motor.

9. The lubrication system of claim 1, further comprising a lubricant reservoir.

10. The lubrication system of claim 9, further comprising a lubrication level sensor configured to detect at least one of a level or quantity of lubricant in the lubricant reservoir.

11. The lubrication system of claim 1, further comprising:

a housing configured to house the controller; and a user interface associated with the housing.

12. The lubrication system of claim 11, wherein the user interface comprises a keypad and a display.

13. A lubrication system for a mechanical system comprising:

a peristaltic lubricant pump configured to dispense lubricant;

a stepper motor mechanically coupled to the peristaltic lubricant pump;

a photoelectric lubricant sensor configured to sense an amount of lubricant dispensed by the peristaltic lubricant pump and transmit sensor data associated with a sensed amount of a dispensed lubricant;

a controller communicatively coupled to the photoelectric lubricant sensor and the stepper motor, the controller including one or more processors configured to execute a set of program instructions stored in a memory, the set of program instructions configured to cause the one or more processors to:

receive an operation signal associated with the mechanical system, wherein the operation signal is transmitted to the controller when the mechanical system is activated;

cause the stepper motor to operate upon receiving the operation signal;

receive the sensor data; and cause a change in a rate of the stepper motor based on the sensor data; and a transceiver coupled to the controller and configured to communicate with a remote device, wherein the transceiver is configured to receive status data from the controller and transmit the status data to the remote device, wherein the transceiver is further configured to receive input data from the remote device and transmit the input data to the controller; wherein the remote device is configured to input:

a pre-operation instruction configured to cause the lubrication system to dispense lubricant before receiving the operation signal;

a setting instruction configured to cause the lubrication system to adjust the rate of the stepper motor; and an operation instruction configured to cause the lubrication system to switch between an ON status and an OFF status.

14. The lubrication system of claim 13, further comprising a housing configured to house:

a user interface, wherein the user interface comprises a keypad and a display; and the peristaltic lubricant pump.

* * * * *